Nov. 28, 1967 S. W. HOBDAY 3,354,857

HYDROFOIL CRAFT

Filed Sept. 13, 1965 12 Sheets-Sheet 1

INVENTOR
Stephen W. Hobday

BY Hall, Pollock & Vande Sande
ATTORNEYS

Nov. 28, 1967 S. W. HOBDAY 3,354,857

HYDROFOIL CRAFT

Filed Sept. 13, 1965 12 Sheets-Sheet 2

INVENTOR

Stephen W. Hobday

BY Hall, Pollock & Vande Sande

ATTORNEYS

INVENTOR
Stephen W. Hobday
BY Hall, Pollock & Vande Sande
ATTORNEYS

INVENTOR
Stephen W. Hobday

BY Hall, Pollock & Vande Sande
ATTORNEYS

HYDROFOIL CRAFT

Filed Sept. 13, 1965 12 Sheets-Sheet 5

INVENTOR

Stephen W. Hobday

BY Hall, Pollock & Vande Sande

ATTORNEYS

HYDROFOIL CRAFT
Filed Sept. 13, 1965 12 Sheets-Sheet 6
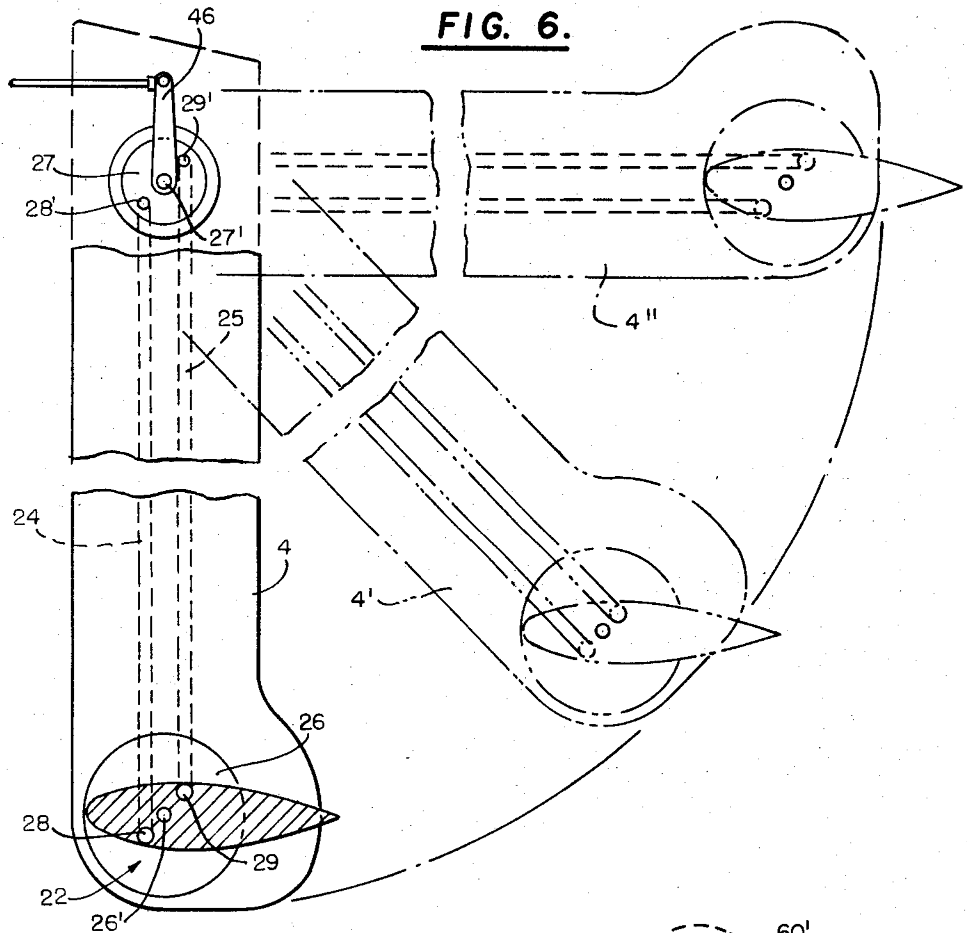
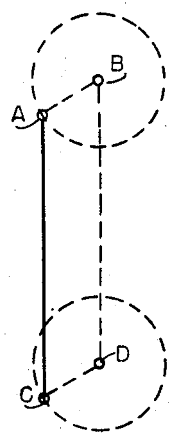
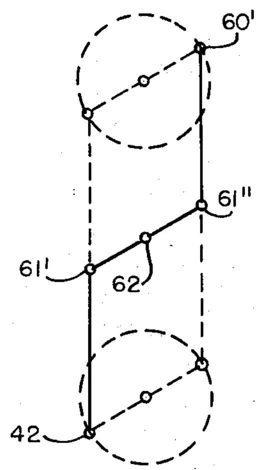
INVENTOR
Stephen W. Hobday
BY Hall, Pollock & Vande Sande
ATTORNEYS INVENTOR
Stephen W. Hobday BY Hall, Pollock & Vande Sande
ATTORNEYS INVENTOR
Stephen W. Hobday
BY Hall, Pollock & Vande Sande
ATTORNEYS INVENTOR
Stephen W. Hobday BY Hall, Pollock & Vande Sande
ATTORNEYS INVENTOR
Stephen W. Hobday BY Hall, Pollock & Vande Sande
ATTORNEYS

HYDROFOIL CRAFT

Filed Sept. 13, 1965 12 Sheets-Sheet 11

INVENTOR
Stephen W. Hobday

BY Hall, Pollock & Vande Sande
ATTORNEYS

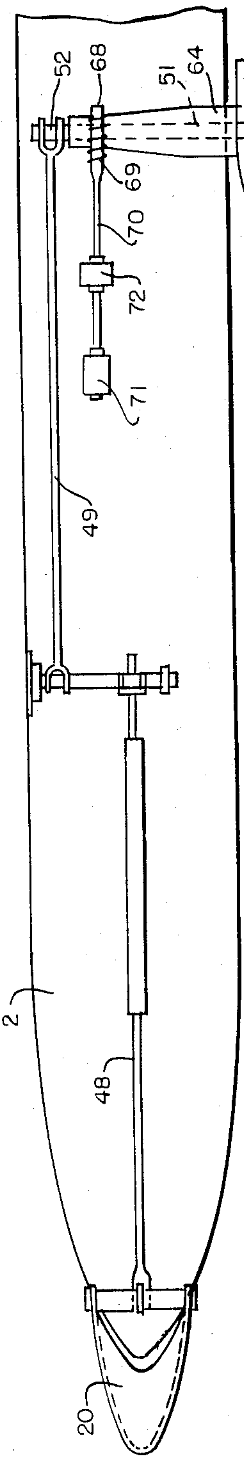
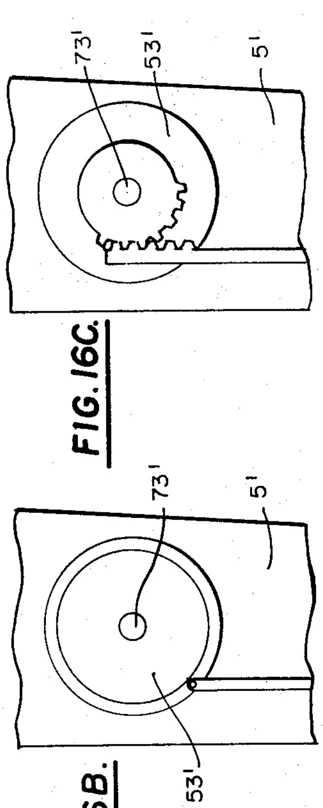
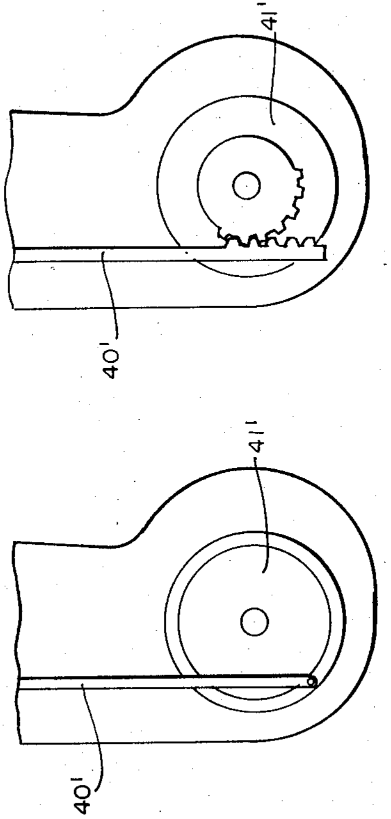
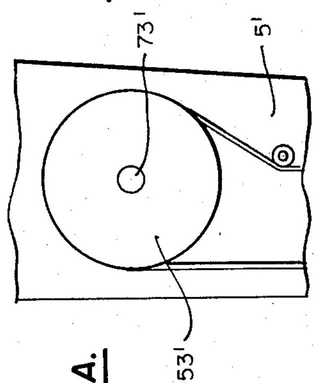
INVENTOR
Stephen W. Hobday
BY Hall, Pollock & Vande Sande
ATTORNEYS United States Patent Office 3,354,857 Patented Nov. 28, 1967

3,354,857 HYDROFOIL CRAFT

Stephen W. Hobday, 219 Sycamore Road, Farnborough Hants, England

Filed Sept. 13, 1965, Ser. No. 486,716
19 Claims. (Cl. 114—66.5)

This invention relates generally to marine or water craft of the type having fully or partially submerged hydrofoils or water foils for support of the hull out of the water at cruising speeds. More particularly, this invention, among other things, relates to a system for allowing hydrofoil struts upon which hydrofoil wings are mounted to be retracted or lowered by rotation without changing the angle of incidence of the hydrofoil wings.

The two major hydrofoil systems in use today are the surface-piercing type and the completely submerged type. There are three basic positioning arrangements for the hydrofoils: conventional, that is, with the major foils forward and a small balancing foil aft; tandem, that is, with weight evenly distributed on two sets; and canard, that is, with the main foils aft and third one forward.

Many of the hydrofoil boats as heretofore constructed suffered from the disadvantage that the foils on which the boat rides when it is traveling at high speed are carried on struts which project beneath the boat to an appreciable extent, with the result that when the boat is hull-borne an appreciable depth of water is required. It is also correspondingly difficult to draw the boat up on a slipway or to beach it from shallow water.

A further difficulty associated with the operation of hydrofoil boats as heretofore constructed is that the foils being held beneath the boat on fixed struts and often projecting laterally beyond the side of the hull made berthing difficult and enhanced the likelihood of damage to the under-water structure when the boat would roll in a choppy sea when alongside a wharf.

It is an object of the present invention to provide a hydrofoil system which avoids these prior art difficulties.

It is further desirable in hydrofoil craft to have the hydrofoil struts retractable in such a manner that the hydrofoils may be useful in shallow water operations. Heretofore, when a hydrofoil structure was lowered or retracted, for example, by rotating the hydrofoil strut, the angle of incidence or attack of the hydrofoil wing varied during such lowering or retracting, destroying the lift characteristics of the foils and creating a substantial amount of drag. Furthermore, upon retraction the hydrofoil structure often protruded beyond the sides of the water craft thereby greatly enhancing the danger of damage to the hydrofoil structure.

It is thus a further object to provide a structure which will overcome these prior art deficiencies. Therefore, in the present invention the struts carrying the foils shall be so mounted on the hull that they may be folded rearwardly to an inoperative position in which they lie protected alongside the hull. In addition, the foils are so mounted on the struts that when the struts are folded rearwardly the foils remain in a substantially horizontal position, thus still providing lift and presenting a minimum amount of drag.

The improved arrangement of the present invention preferably also incorporates means which enable the struts to rotate rearwardly to their inoperative position if, while they are extended, they strike an obstacle. Previously, it has not been feasible to do this because the rearward strut rotation, with fixed angle of foil relative to strut, has inherently resulted in a negative angle of attack of the foil, thereby tending to produce a "crash" landing. In the present invention, a pre-loaded clutch or like device is incorporated in the hinge whereby the struts are joined to the hull, rather than, as in the prior art, providing a mounting of the struts on the hull and designed to break off at the hull in the event of impact. The subsequent loss and replacement of a strut is a serious and expensive matter, and this difficulty may be completely avoided by the arrangement of the present invention since arrangements can be provided which operate to return the strut to its operative position in the event that it is moved to its folded position as a result of impact.

In a preferred arrangement according to the present invention each strut is provided with a foil which is rotatably mounted at the lower end of the strut. For this purpose the foil may be formed in two symmetrical parts which project on either side of the strut and are provided at their inner ends with flanges which are bolted together and embrace a central boss on the strut about which they can pivot. The struts are conveniently made hollow and the flanges of the foils connected by suitable driving means which extend through the strut whereby the angle of incidence of the foil can be varied during use. At its upper end the strut may be pivotally mounted on the hull of the boat and appropriate driving means may be provided, either mechanical, electrical, hydraulic or pneumatic, for moving the strut about its pivot between its operative and inoperative positions. Preferably, the arrangement is such that as the strut moves, the angle of incidence of the foil is automatically and in correspondence varied, for example, to provide desired characteristics when the strut is moved to its normally operative or inoperative positions or a position therebetween.

The position of the connection of the strut with the hull of the boat is preferably such that when the strut is move to its folded or inoperative position it lies alongside the hull, or in a slot in the hull, conveniently with the foils extending behind the rear end of the hull and in a position where least drag is imposed on the boat when it is underway in its hull-borne position.

It has been found that the application of hydrofoil principles to catamaran boats is attractive since such boats are characterized by much greater roll stability as compared with single hull boats and also by the reduced draft which the use of two hulls can make possible. However, for boats of this type which are constructed using an aeroplane foil configuration, that is to say one in which one or two forward foils carry most of the weight, the absence of a central structure at the water level well aft of the main part of the boat makes the design of the rear foil and strut assembly very difficult.

This disadvantage is overcome by the improved boat of this invention which incorporates a third hull which is positioned between the two normal catamaran hulls and preferably extends beyond the rear thereof, the third hull providing a mounting for the rear strut and foil assembly. By this means the roll stability of a catamaran type boat is retained, while in small boats additional headroom is provided in the boat since the design of the third hull may be such that it becomes possible to walk upright in the central part of the structure without the necessity of increasing the cabin height and thereby occasioning excessive wind resistance. The third hull also provides a convenient space for the necessary engine and other gear which can accordingly be well spaced from the cabin with advantages in reduction in noise, fumes and risk of fire, or the engine and other equipment can be placed in one or both of the outer hulls for complete isolation.

In a modification of the improved boat of this invention the central hull could also be arranged to extend forward of the two outer hulls or could be made longer than the two outer hulls, particularly in the case where a configuration is adopted in which the forward foil carries less than half the weight of the boat.

The improved arrangement of this invention also has the advantage that where the forward struts are mounted in such manner that they can be folded to an inoperative position, the struts can be mounted on the inner sides of the outer hulls and arranged so that when folded rearwardly their rear ends lift clear of the water and the foils lie just behind the sterns of the outer hulls in a position where they are protected but are still readily accessible.

In the improved boat of this invention, advantage may be taken of the air flow over the body of the craft and through the gap beneath it when it is foil borne by designing the structure between the hulls so as to have an aerofoil shape and to incline it so that lift is generated both by the ram effect of airflow beneath the craft and by the reduced pressure of aerodynamic flow over the upper surface.

Other objects and many of the attendant advantages of the present invention will become more readily apparent upon consideration of the following detailed specification when considered in connection with the accompanying drawings wherein:

FIGURE 6 is a side view of the power strut.

FIGURE 13 is a cut-away view of a portion of an outer hull.

FIGURES 14 and 15 are geometrical figures; and

Figure 1:
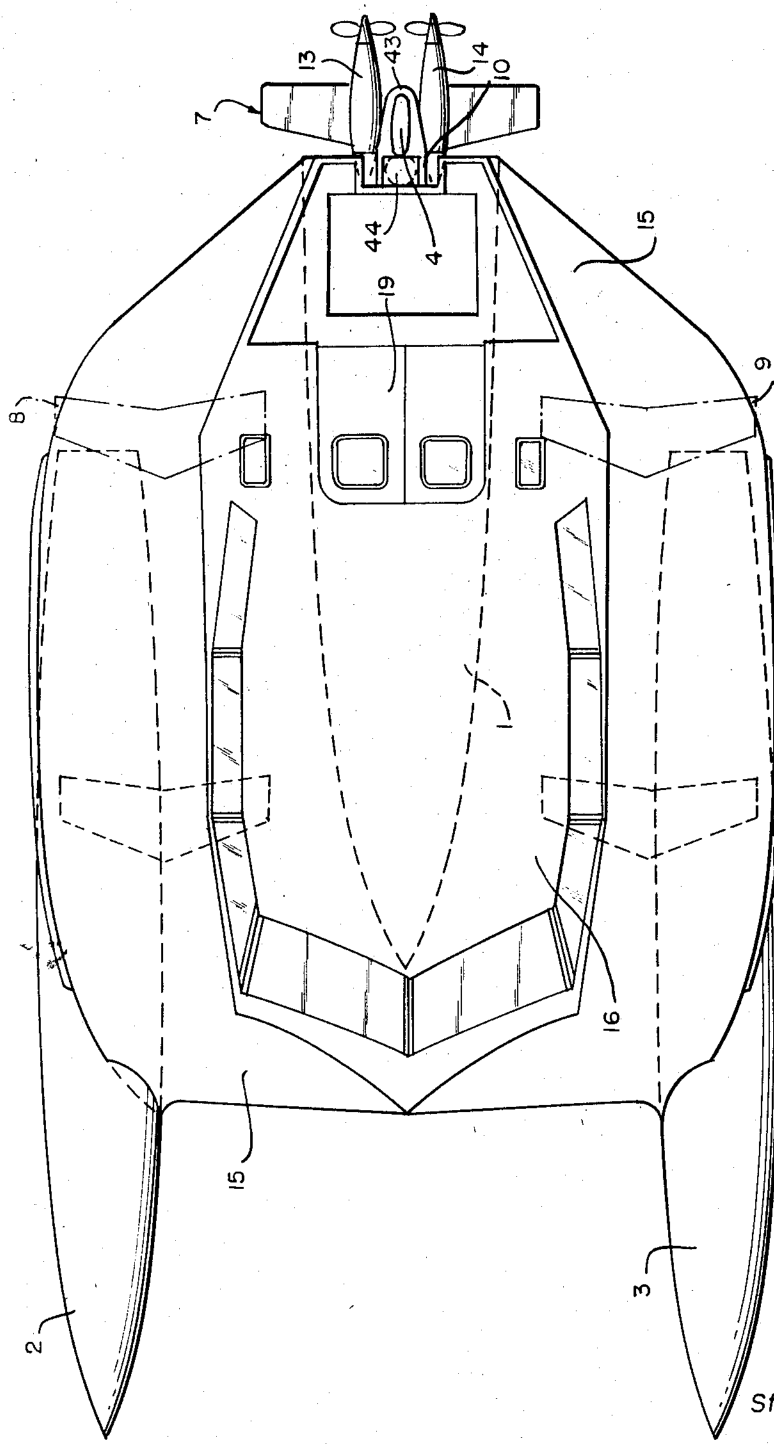
FIGURE 1 is a top view of a hydrofoil craft embodying the present invention.
Figure 2:
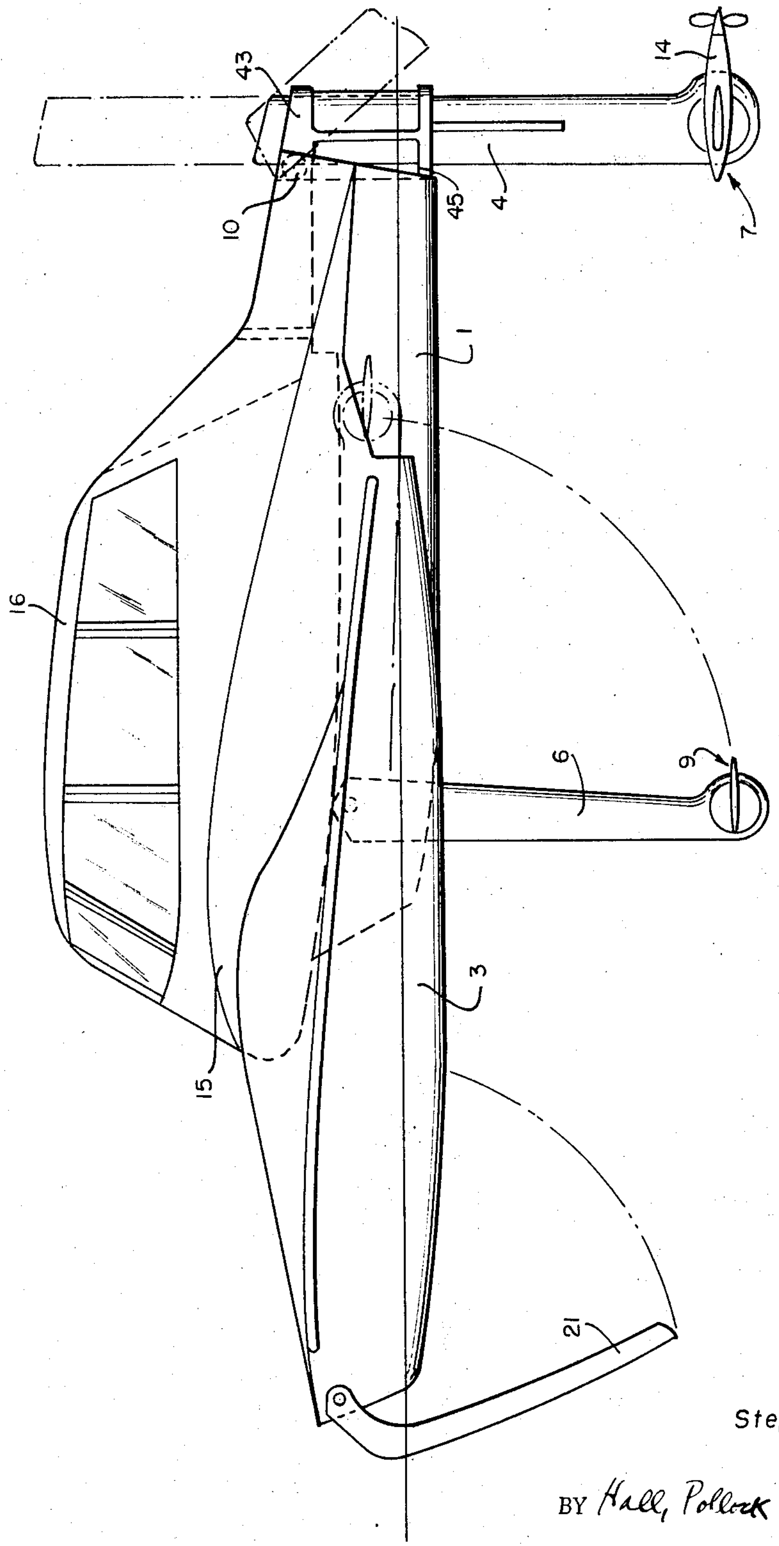
FIGURE 2 is a side view of the craft of FIGURE 1.
Figure 3:
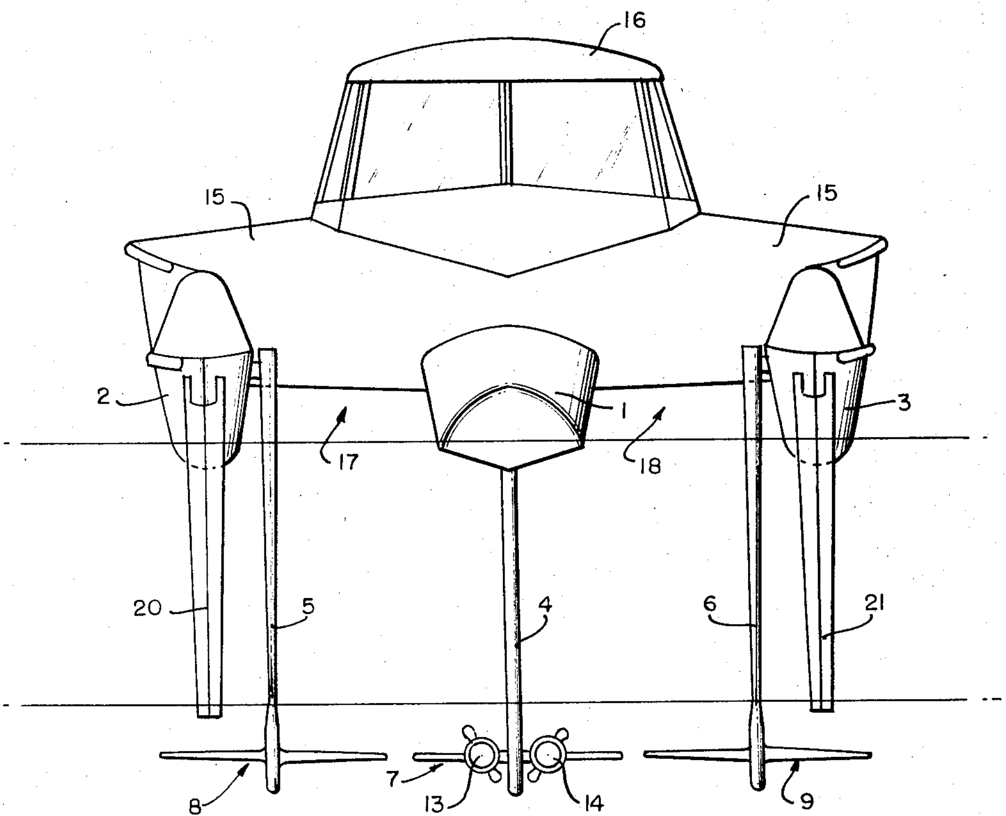
FIGURE 3 is a front view of the craft of FIGURE 1.

FIGURES 16A, B and C are cut-away views of three modifications of the mechanical linkage system used in the present invention.

FIGURES 1 through 4 show a water craft using fully submerged hydrofoils in the conventional arrangement, embodying the principles of the present invention. The hydrofoil craft is of the trimaran hull type, that is, the water craft is supported by three hulls, 1, 2 and 3, when the craft is water-borne. Each of the hulls, 1 through 3 has a hydrofoil strut 4, 5 and 6, respectively, mounted thereon. At the bottom of each hydrofoil strut is a hydrofoil wing structure 7, 8 and 9 which, when passing through the water at cruising speeds, provides lift to the water craft sufficient to support the water craft out of the water and cause it to "fly" above the surface of the water. Each of the hydrofoil wings is rotatably mounted on its respective hydrofoil strut whereby the angle of incidence of the hydrofoil wing can be changed by a total of about 20° to provide greater or less lift or to change the trim of their hydrofoil wing. The hydrofoil struts are mounted on their respective hulls by means of support structures 10, 11 and 12. The hydrofoil struts may be lowered or retracted by rotation about its respective support structure of a total of about 90°. The hydrofoil structure 4 and 7, besides providing lift and trim to the water craft, also provides motive power to the water craft by means of the propulsion units 13 and 14.

The hulls 1, 2 and 3 of the water craft are bridged by means of a body structure 15, which includes a cockpit or housing unit 16, and are thus maintained in a separated, adjacent and side-by-side fashion. The body structure 15 and the three hulls 1, 2 and 3 form therebetween recesses 17 and 18. The forward portion of the cockpit unit is occupied by the operator or the "skipper" of the water craft, the remainder of the housing unit providing space for passengers or cargo. Access to the housing unit 16 is gained through the entrance door 19.

The portions of the body structure 15 are designed according to the well-known principles of aerodynamics to have an inclined aerofoil shape to give increased lift to the boat in addition to the lift created by the hydrofoils. The air flow over the body 15 of the craft and through the gaps or recesses 17 and 18 beneath it generate lift by the ram effect of airflow beneath the craft and by the reduced pressure of aerodynamic flow over the upper surface.

The "outrigger" hulls 2 and 3 may house the engines or power source which drive the propulsion units 13 and 14. The hulls 2 and 3 may also serve to house other auxiliary running gear, for example, control units, generator sources, etc. Thus, with the passengers and operator and cargo occupying the central hull, all of the running gear is isolated therefrom by being housed in the outrigger hulls 2 and 3, thereby substantially reducing the noise and vibration in the housing unit emanating from the "running gear."

Unlike partially submerged hydrofoil systems, the fully submerged hydrofoil system is not inherently stable and thus an autopilot control device is required to keep the water craft properly foil borne. Both sophisticated electronic autopilots (see, for example, my U.S. Patent No. 2,722,189) and satisfactory mechanical control units (see, for example, my U.S. Patent No. 2,890,671) have been developed, and one of the latter types is incorporated in the water craft of the present invention. Mechanical control sensors 20 and 21 are pivotally secured to the outrigger hulls 2 and 3 above the water surface; each control sensor tapers into a blade which is adapted to trail in the water. Each control sensor is given a transverse bend which increases in sharpness as the width of the taper diminishes to increase its rigidity and to cause it to run steadily through the water. The water pressure on the blade varies according to the speed of the craft and to the amount of blade immersed, and the blade is angularly displaced in relation to the hull to an extent dependent on the water pressure. The angular movements of the control sensors 20 and 21 are transmitted to the hydrofoil wings 8 and 9, respectively, by means of an appropriate mechanical linkage system which will be explained in further detail below. The pitch of the hydrofoil wings 8 and 9 is thereby in part controlled by the angular position of the control sensors 20 and 21, thus varying the lifting effect according to speed and to the distance of the hulls above the water.

Figure 4:
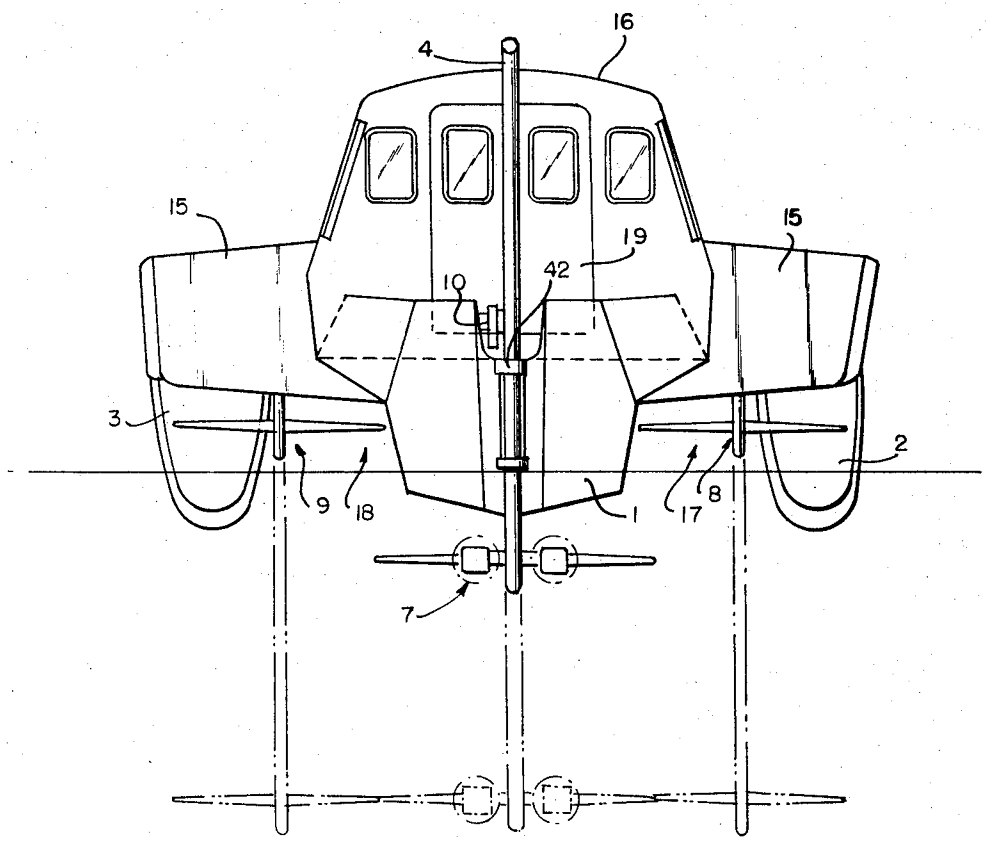
FIGURE 4 is a rear view of the craft of FIGURE 1.

In order for the water craft to be operable in shallow water, the hydrofoil struts 4, 5 and 6 are rotatably mounted on the trimaran hulls 1, 2 and 3 so that the hydrofoil structures may be lowered or retracted to the desired depth or, if desired, be completely retracted for water-borne surface operation, as shown in FIGURE 4. Upon retraction, the hydrofoil structures 5 and 6 are housed in recesses 17 and 18 and therefore are fully protected from damage from contact with external objects. However, upon rotation or upon the changing of the hydrofoil depth, it is necessary for proper foilborne or above surface operation for the angle of incidence of the hydrofoil wings 7, 8 and 9 to remain the same. It is to this problem that one of the primary aspects of the present invention is directed.

It is known from the laws of geometry that in a diagram like that shown in FIGURE 14, if the distance between points A and C is equal to the distance between the points B and D, and if the distance between points A and B is equal to the distance between C and D, then the figure A,B,C,D, is a parallelogram, and the line $\overline{AB}$ is parallel to the line $\overline{CD}$. Thus, if $\overline{AC}$ and $\overline{BD}$ are maintained parallel, and if A is allowed to rotate about B as its point of rotate and C is allowed t orotate about D as its point of rotation, then the line $\overline{AB}$ will constantly remain parallel to the line $\overline{CD}$. Therefore, if the conditions of equality and rotation outlined above are met, a structure connected to the points C, D, will maintain a constant angular relationship with a structure mounted on the points A, B, by the "parallelogram" action described above.

Figure 5:
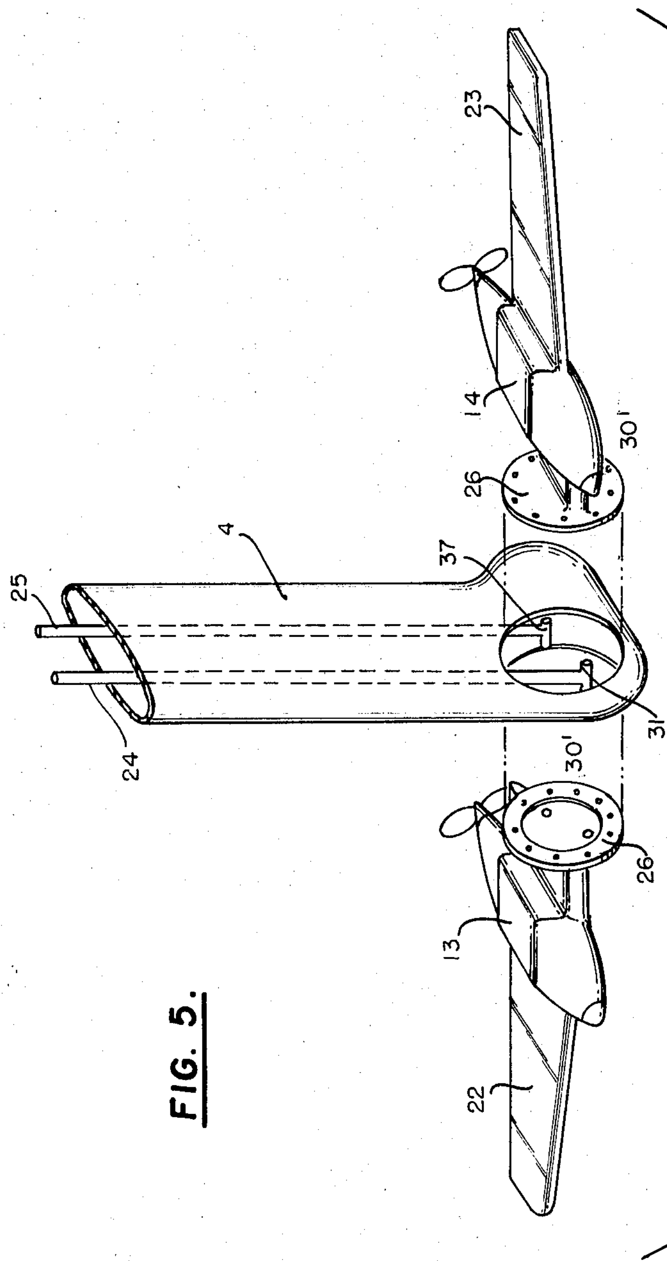
FIGURE 5 is an exploded perspective view of the power strut of the present invention.
Figure 7:
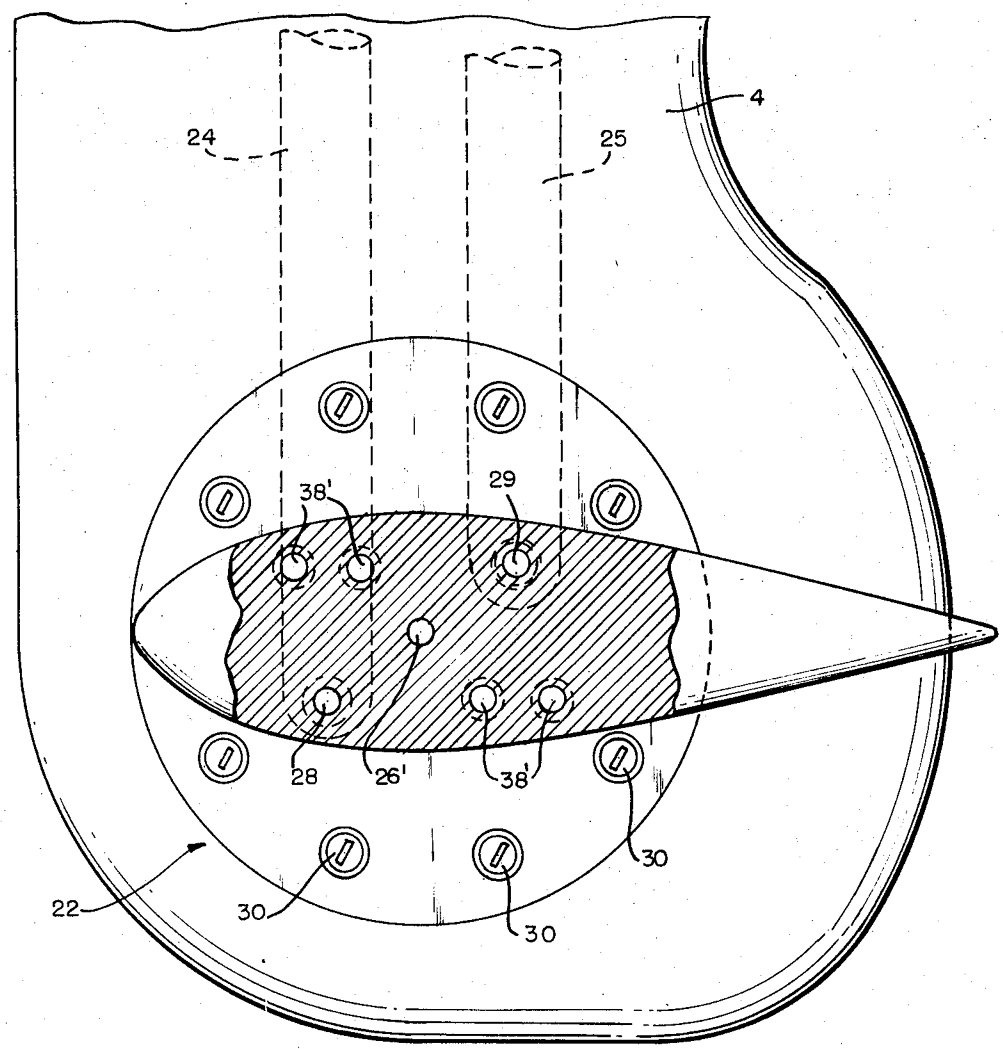
FIGURE 7 is a detailed blow-up of a portion of FIGURE 6.
Figure 8:
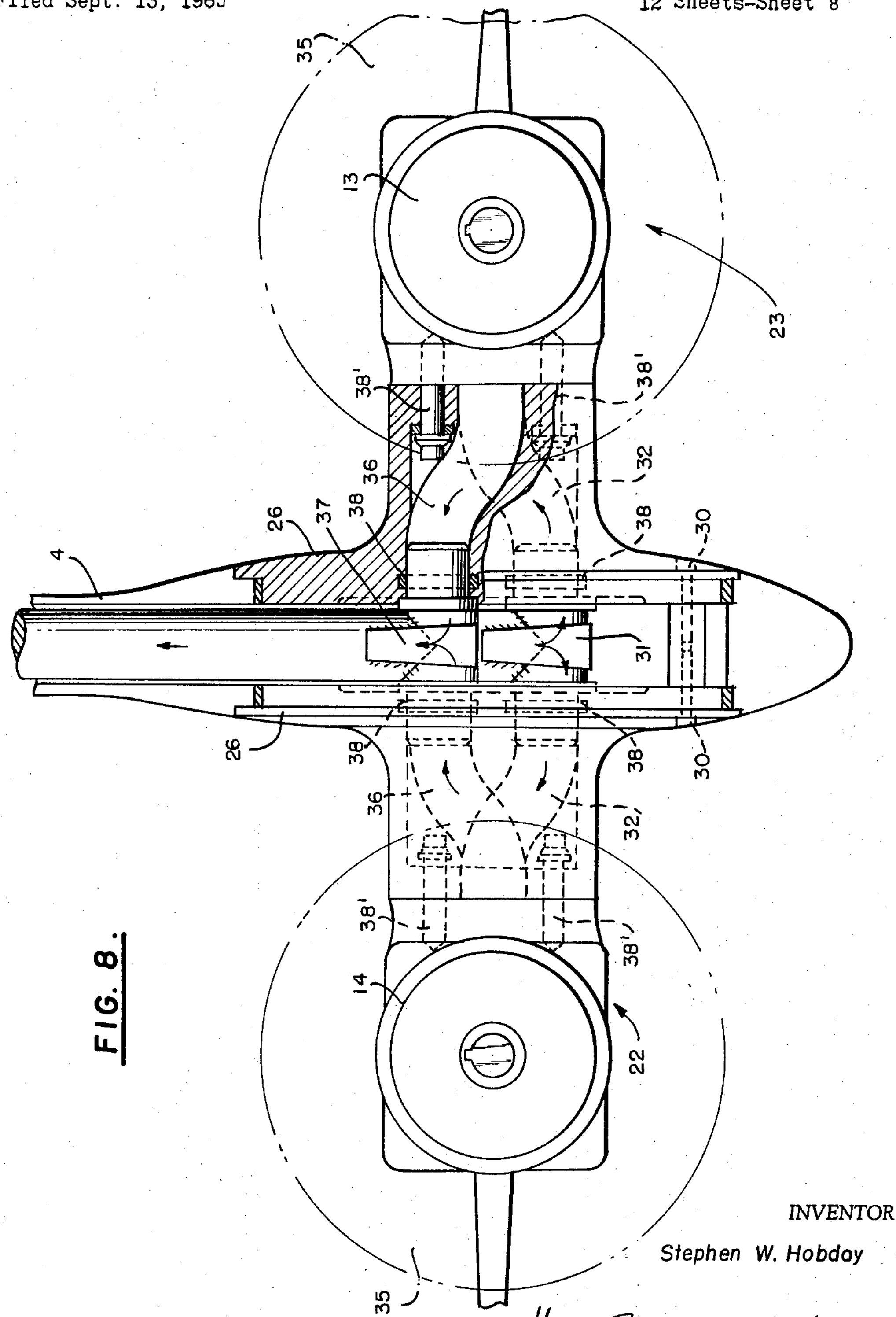
FIGURE 8 is a rear view, partly in section, of the power strut.
Figure 9:
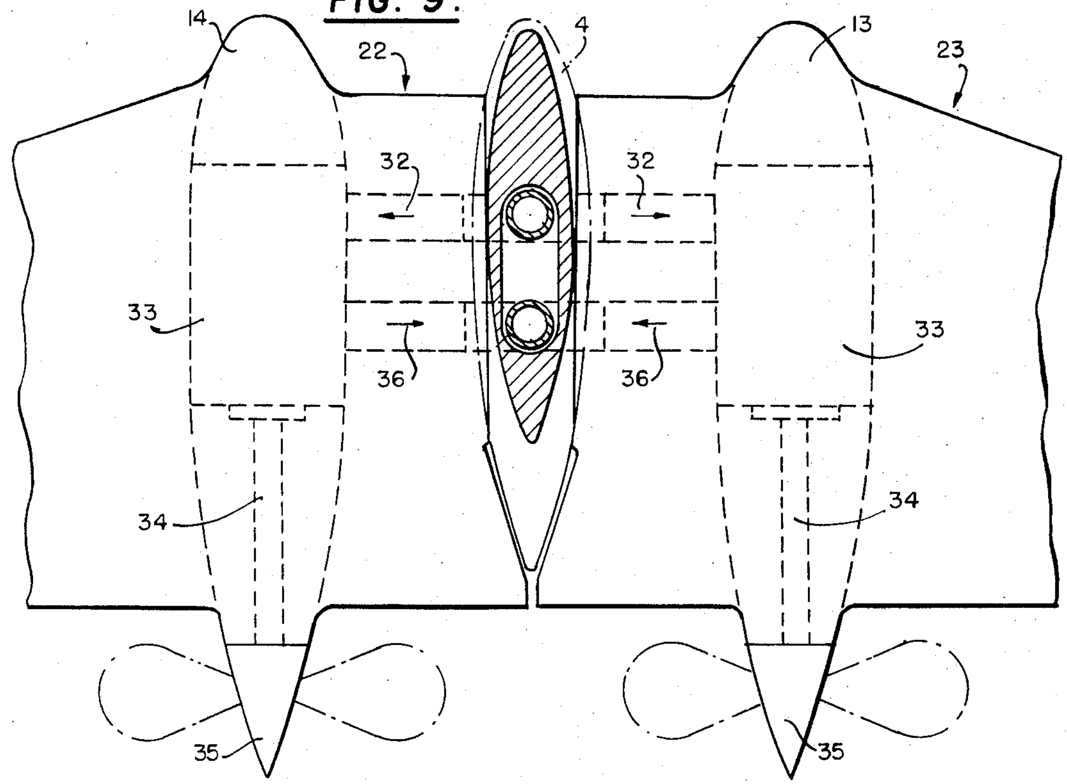
FIGURE 9 is a top view of the power strut, partly in section.
Figure 10:
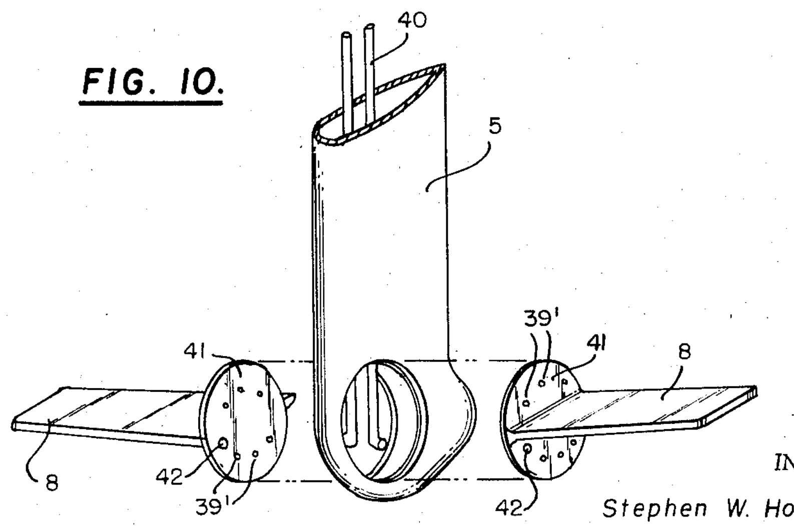
FIGURE 10 is an exploded, perspective view of a forward strut.

As can be seen in the exploded diagram of FIGURE 5, the power strut 4 has two hydrofoil wing sections 22 and 23 rotatably mounted thereon. When the hydrofoil strut 4 is rotated about its support structure 10 thereby lowering or retracting the hydrofoil structure, the hydrofoil wings maintain a constant angle of incidence with respect to the hull. This is accomplished by means of a "parallelogram" mechanical linkage system comprising two control rods 24 and 25 and circular flanges 26 and circular plate 27. The control rod 24 is connected to the circular structures 26 and 27 at connecting points 28 and 28', respectively, while the control rod 25 is connected at connecting points 29 and 29', respectively. The circular structures 26 and 27 rotate about the central points 26' and 27', respectively. The central point 26' lies on the same line as the connecting points 28 and 29 and is equidistant from them both; the central point 27' likewise lies on the same lines as connecting points 28' and 29' and is equidistant from them both. Because the two rods 24 and 25 are parallel and because the two lines determined by the connecting points and central points are also parallel, the four connecting points 28, 28', 29 and 29' determine a parallelogram. When the hydrofoil strut 4 is raised to a position 4' and eventually to a position 4'', the position of complete retraction, while support structure 10 remains stationary, the hydrofoil wing sections 22 and 23 maintain their initial angle of incidence because of the "parallelogram" action of the mechanical linkage system. Thus the wing sections 22 and 23 are caused to rotate a total of 90° within the hydrofoil strut 4 as the strut is completely retracted from a vertical to a horizontal position. The two circular flanges 26 are held together by a series of connecting bolts 30 whereby the two rotate together in unison about the central point 26'.

Another unique feature of the present invention is the utilization of the control rods 24 and 25 as intake and exhaust lines for the hydraulic fluid which drives the turbine type propulsion units 13 and 14. Hydraulic fluid, for example, oil, is pumped from a source of fluid pressure preferably housed in one of the "outrigger" hulls 2 or 3 through the control rod 24. At the connecting point 28, a T-joint is provided at the bottom of the control rod 24 which causes the hydraulic flow to be diverted into the intake channels 32. The hydraulic fluid then flows into the turbine housings 33 and acts on the turbine blades therein, causing the turbines to rotate. The turbines are mechanically coupled to propellers 35 by means of the drive shafts 34 whereby the turbines, drive shafts, and propellers rotate together, propelling the water craft through the water. After flowing through the turbine housings 33, the hydraulic fluid is then exhausted through the exhaust channels 36 to the T-joint 37 and up through the control rod 25. Suitable tubing is provided between the source of fluid pressure and the control rods 24 and 25 to complete the fluid circuit. In order to prevent fluid leakage, suitable fluid seals 38 are provided at appropriate places. The drive of the propulsion units 13 and 14 can be "reversed" by merely reversing the direction of the fluid flow.

The foil wing sections 22 and 23 of the power strut 4 are basically used for propulsion and, by varying the angle of incidence by the control elements 24 and 25, for trim adjustments. The foil wing sections 22 and 23 are connected to the circular portions 26 by means of a series of bolts 38.

The power strut 4 is mounted on the hull 1 by means of a sleeve element 43. The power strut 4 may be vertically raised or lowered in the sleeve 43 by means of a motor driven rack and pinion arrangement or alternatively a hydraulic jack structure having mechanical locks at each end of travel. The sleeve element 43 is pivotably mounted on a vertical axis rudder post 44 which lies just behind the hull transom and extends the full height of the transom. The rudder post 44 is secured by top and bottom bearings and is allowed to rotate with respect to the hull by means of a suitable control mechanism which thereby guides the direction of the boat. The horizontal pivot point 10 of the sleeve element 43 allows the power strut 4 to rotate rearwardly when the power strut 4 hits an obstruction. The sleeve 43 is maintained in a vertical position during normal operation by means of a spring loaded clip 45 located at the bottom of the sleeve element 43. The spring of the clip element 45 can be released manually by a toggle mechanism or forcefully upon impact. After impact the normal forward propeller thrust would cause the sleeve 43 to re-engage the catch of the clip element or, if not, the spring could be released by hand. Because the power strut 4 can be vertically raised and lowered within the sleeve 43, no additional mechanism for controlled rotation about the horizontal axis 10 is considered necessary. Should it be desirable to inspect the propellers or lift them from the water during lay-up, then the power strut 4 is vertically raised and a small block and tackle is used from the top of the strut to the deck to pull the top down and forward about the point 10 and so raise the rear end of the strut.

The angular position of the foils 7 of the power strut 4, as pointed out above, is controlled by the control rods 24 and 25 and ultimately by the angular position of the circular plate 27. The angular position of the circular plate 27 can be in turn controlled by a worm and wheel drive or other similar drive or by control cables from the cabin or cockpit 16. A very simplified control mechanism 46 is illustrated in FIGURE 6.

It is noted that, because the power strut 4 does not normally rotate except on impact and because the forward struts 5 and 6 provide substantially all of the lift, the maintaining of a constant angle of incidence for the rear foils 7 during rotation is not particularly critical. Hence, even though the horizontal pivot 10 does not coincide with the center of rotation of the circular plate 27, the power strut structure illustrated and described performs its function adequately and satisfactorily.

The forward or non-power struts 5 and 6 are symmetrical structures and are identical in function. The structure of the forward strut 5 and its associated mechanisms will now be described in detail as exemplary of the forward struts. The hydrofoil portion of the strut 5 has two wing sections 8 mounted on circular flanges 41 which are bolted together by a series of bolts 39'. The flanges 41 rotate in unison within the strut housing 5. The hydrofoils are rotated by means of the control rod 40 which is connected at its lower end to the flanges 41 at points 42 and at its upper end to the control mechanism at point 61'.

Figure 11:
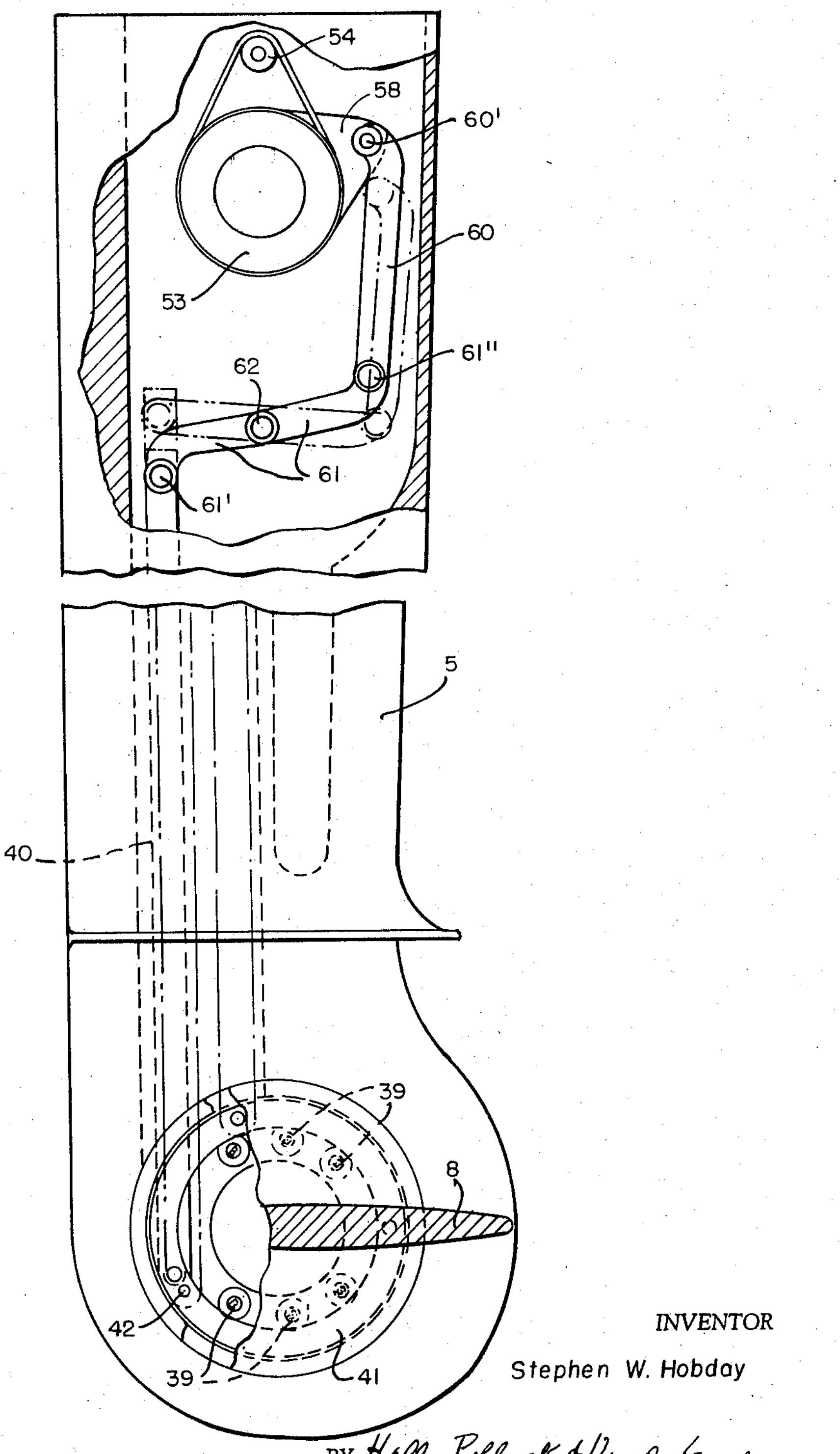
FIGURE 11 is a side view, partly in section, of the forward strut of FIGURE 10.
Figure 12:
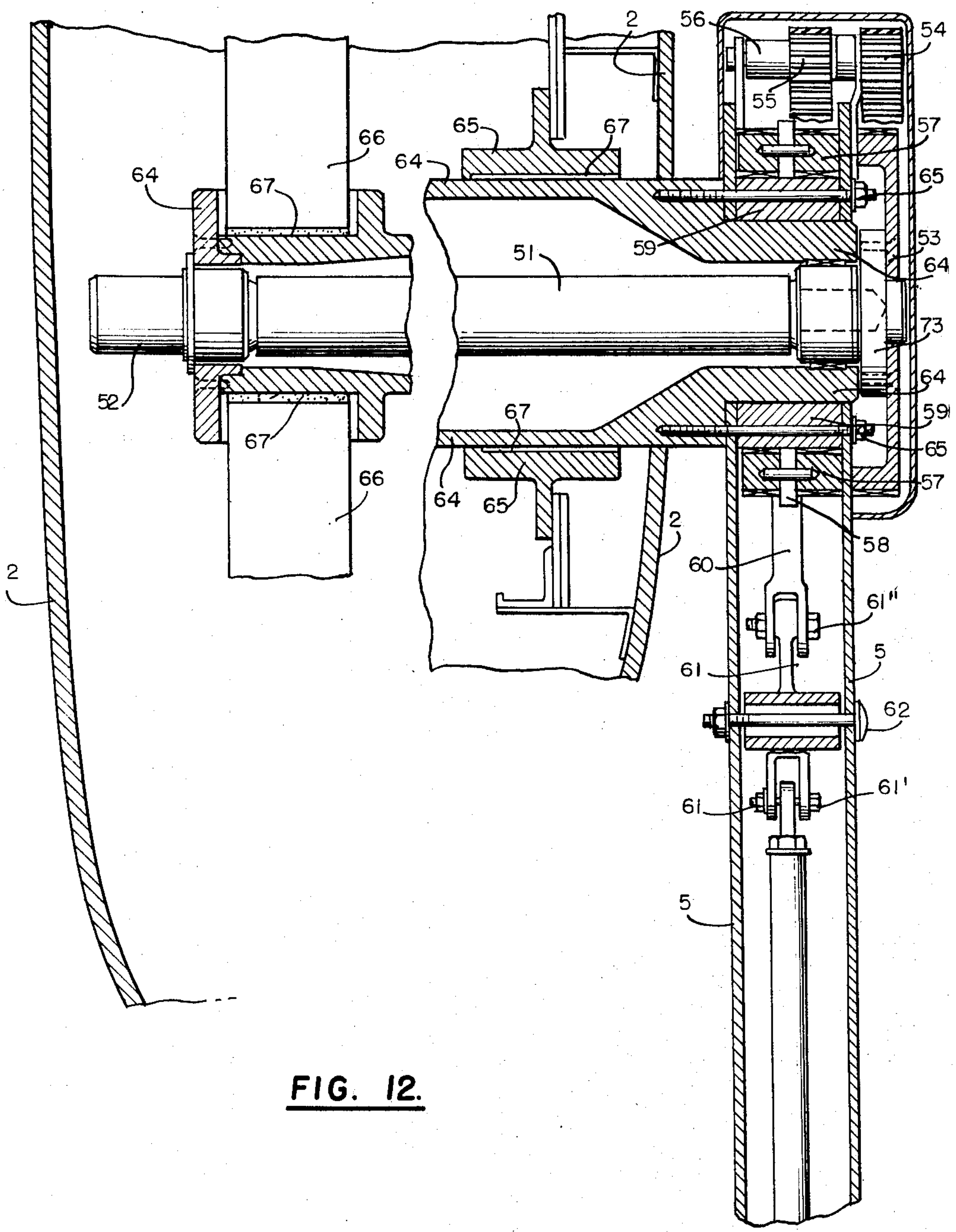
FIGURE 12 is a sectional view of the forward strut of FIGURE 10 and its mounting structure.

A foil control mechanism is illustrated in FIGURES 11, 12 and 13 wherein a control signal originating from a control instrument is mechanically fed to the foils for trimming of the foils and whereby the struts supporting the foils can be retracted or lowered without changing the trim angle of the foil. A maximum range of twenty degrees rotation is usually adequate.

A control signal originating from a control instrument is mechanically fed to the control shaft 51 by means of the input portion 52. This signal causes a rotation of the shaft 51 in either a clockwise or counterclockwise direction. For purposes of illustration, a clockwise movement from the perspective of FIGURE 11 will be assumed. Connected to the shaft 51 is a first control wheel 53, the rotation of shaft 51 causing wheel 53 to likewise rotate. The rotation of wheel 53 causes wheel 54 to rotate by means of a timing belt drive 24. Third control wheel 55 shares a common axis with second control wheel 54 and thereby rotates with control wheel 54. By means of a second timing belt drive 57, wheel 55 causes a fourth control wheel 57 to likewise rotate. Thus, shaft 51, wheel 53, wheel 54, wheel 55, and wheel 57 all rotate together. Associated with the fourth control wheel 57 is a connector and bearing plate 58. Plate 58 serves two functions. It provides a bearing surface by which control wheel 57 rotates over element 59 and also serves as a physical connection to connecting member 60. When wheel 57 rotates in a clockwise direction, it causes plate 58 to force the connecting member 60 downward. This downward movement of 60 causes the connecting rod 40 to be moved upwardly and to the right by means of the connecting element 61 pivoting about the pivot point 62. The connecting rod 40 is connected to the foils 8 and the upward and rightward movement of the connecting rod 40 causes the trim angle of the foils 8 to be changed thereby, in effect increasing the upward angle of incidence of the foils 8. If, on the other hand, a counterclockwise rotation was imparted to the wheel 57, the angle of incidence of the foils 8 would be decreased.

The control signal originates either from the control sensor 20 or from the controls in the cockpit 16. The movement of the control sensor 20 due to the waves and the speed of the craft are transmitted by means of the mechanical connections 48 and 49 to the input portion 52 of the shaft 51. Control signals from the cockpit 16 are also transmitted by means of the connecting mechanism 49.

The control system also allows the strut 5 to be retracted and lowered without affecting the angle of incidence of the foils 8. The strut 5 is fixedly attached by means of the bolts 65 to the element 64 which serves as a hull fitting for the strut 5 and to the element 59 which, as seen above, serves as a surface about which the fourth control wheel 57 can rotate. The fixed strut elements 5, 64 and 59 are mechanically isolated from the control elements 51 through 58, except at the bearing surfaces between elements 52 and 64, and elements 57 and 59, and at the pivot point 62. Because ideally the bearing surfaces between elements 52 and 64, and elements 57 and 59 are "frictionless," movement by the fixed strut elements 5, 64 and 59 does not affect the control elements 51 through 58. Furthermore, because the pivot point 62, when the strut is retracted or lowered, moves about the periphery of a circle and the connecting point 60′ between connector 60 and plate 58 is capable of moving about the periphery of a circle which is concentric to the first circle, the movement of the pivot point 62 does not affect or cause any movement of the connecting point 60′. Thus, the rotating movement of the fixed strut elements is completely isolated from the control elements 51–58, hence, when the strut is retracted the control elements 51–58 remain fixed with reference to the boat structure. Likewise, because the foils are unrestrainted to follow along the periphery of a circle which is concentric to the circle of pivot point 62's travel, it too does not rotate with respect to the boat when the strut member is raised or lowered.

The non-rotation of the control elements 51 through 58 and the foils during the movement of the strut occurs because of the specific design of the linkage 60, 61, and 40 and the placement of their pivot points 60′, 61′, 61″ and 62. The design and placement of these members are such that the longitudinal axis of the control rod 40 is continually parallel to the line which intersects the rotation points 60′ and 61″, and the rotation points 61′, 61″ and 62 all lie on the same line with 62 being at the midpoint between 61′ and 61″. As seen in FIGURE 15, these lines and points thus always determine a parallelogram.

Thus, in total, the foils retain the angle of incidence which the positions of the control elements 51–58 had determined by the parallelogram action described above even though the strut 5 has been rotated.

The forward struts 5 and 6 are usually extended in a normally fixed position but are mounted to the hull members 2 and 3 so that immediate retraction or rearward rotation is allowed upon the struts striking a relatively unmovable object. The mounting also allows controlled rotation for the lowering or retracting of the struts 5 and 6 on command.

As is seen in FIGURES 12 and 13, the strut 5 is fixedly attached to the hull fitting 64. The hull fitting 64 is supported by mounts 65 and 66 at the bearing surfaces 67 which allow the strut 5 to rotate with respect to hull member 2. The exterior surface of the element 64 is provided with a quadrant of worm gear teeth 68 which cooperate in driven relationship with worm gear drive 69. The worm gear drive is driven by a reversing electric motor 71 through a main shaft 70. When the electric motor is switched on, causing shaft 70 to rotate, the worm gear drive 69 through the gear teeth 68 causes the strut 5 to pivot about the point 73. Connected between the motor 71 and worm drive 69 and along the main shaft 70 is a slipping clutch 72. The electric motor 71 includes limit switches at each end of maximum strut movement. With this arrangement, should the strut 5 strike an obstacle, the clutch 72 slips and permits the strut 5 to pivot rearwardly. However, as soon as this occurs the forward limit switch closes and energizes the motor 71 which returns the strut 5 to its normal forward position as soon as the obstacle has been cleared.

An alternate "rotation and return" system for the strut uses a hydraulic cylinder with an accumulator closely coupled to it. The position of the ram is determined by normal hydraulic controls with a small pressure sustaining leak to hold the ram at whichever end of its travel it is required to stop. A mechanical lock would also be incorporated to hold the strut in the "up" position when the craft is not in use. On the occasion of the craft striking an obstacle the oil is forced from the cylinder into the accumulator, but as soon as the obstacle is cleared the oil will immediately return to the cylinder and restore the strut to the normal position. This system has the advantage that the energy is not wasted but is stored in the accumulator to bring about a very rapid return of the strut.

FIGURES 16A, B and C show various other mechanical arrangements for securing the "parallelogram" action which is one aspect of the present invention. The hydrofoils are mounted on the circular, rotating structures 41′. The control signals for determining the angle of incidence or the angle of attack is fed to the foils by means of the rotating structure 53′ and the mechanical linkage 40′. When the strut 5′ is rotated or pivoted about the point 73′, the mechanical linkage system maintains the angle of incidence of the foils constant. The mechanical linkage systems 40′ comprise sprocket and chain arrangement, a straight connecting rod and a rack and pinion arrangement in FIGURES 16A, 16B and 16C, respectively.

Because of its comparative simplicity, inexpensiveness, durability and dependability, a mechanical system employing "parallelogram action" has been described and illustrated. However, many other systems, both mechanical and non-mechanical, can be utilized to achieve a constant angle of incidence of the foils with respect to the hull of the craft while the support strut is being pivoted or rotated, and these systems are contemplated to be within the scope of the present invention. For example, an electrical system could be used to "sense" the rotation and the amount thereof of the strut; the foils could then be counter-rotated in correspondence to the rotation sensed and thus the foils would maintain a constant angle of incidence with respect to the hull during the rotation. Alternatively, the same electrical signal used to cause the strut to rotate could be used to cause the foils to counter-rotate.

Although a preferred embodiment of the invention has been particularly described, many variations of the preferred embodiment are possible within the scope of the present invention. For example, a retractable, partially submerged or surface-piercing hydrofoil system could be used, or, alternatively, a hybrid system, that is, the combination of both partially submerged and fully submerged hydrofoils could be used in the present invention. Furthermore, although a conventional type foil arrangement was described, the invention would also be applicable to tandem and canard arrangements, among others.

Likewise, the struts shown and described rotate ninety degrees and pivot about a horizontal axis transverse to the longitudinal axis of the craft. However, design considerations may lead one to vary the total amount of angular rotation available and to put the axis of rotation at an angle off the horizontal.

Even though a trimaran type hull is particularly suited to the present invention, other hull types and arrangements are contemplated to be within the scope of the invention. With larger vessels it may well be that suitable recesses and/or protective bulges are provided on the hull, or the struts and foils merely retract close to the hull. Additionally, the propulsion unit or units may be placed either forward or aft and may be incorporated in more than one hydrofoil strut. It is further contemplated to have a hydrofoil wing section supported by more than one hydrofoil strut, for example, the hydrofoil wing section could extend from a strut on one outrigger hull to a strut on the other.

In addition, because it only requires one fixed connecting rod to complete the "parallelogram" structure, one of the control rods in the power strut described above may be made of flexible tubing. Furthermore, if an expendable fluid like water is used in the fluid drive system, only one control rod would be necessary for feeding the fluid to the propulsion unit since the fluid upon passage through the turbine housing could be directly discharged. Likewise, forms of motive power other than a turbine system can be used in the hydrofoil craft utilizing the present invention.

The variations described immediately above are merely exemplary of the various other forms and other uses possible with my invention, and the scope of the invention is to be defined by the subjoined claims interpreted in the light of the specification and drawings.

I claim:

1. In a hydrofoil craft, of the type adapted for fully foil-borne operation, the combination comprising,
- a trimaran hull,
- at least one strut disposed between each pair of hulls and supporting a lift-imparting foil adjacent its one end,
- support means for connecting each strut to at least one of the hulls of the associated pair,
- said support means selectively permitting operation of at least some of said struts from a downwardly extended position in which said foils are disposed to permit fully foil-borne operation of said craft to a rearward fully retracted position in which said struts and the associated foils are protected by the outermost hulls and means within said strut responsive to rotation of said strut from its downwardly extended position to its rearwardly retracted position for maintaining a positive angle of incidence between the associated foil and the hull of said craft over at least a part of the rotation of said strut.

2. The combination of claim 1 which further includes a rear strut connected to the stern of the center hull and also carrying a foil connected adjacent an end thereof,
- and support means for said rear strut permitting movement of said strut vertically along its axis and also permitting rearward pivoting of said strut generally along the axis of said craft in the event that said rear strut or its associated foil strikes a submerged obstacle.

3. The invention as defined in claim 1 which further includes a cabin and cockpit enclosure supported by said trimaran hull, said enclosure having an airfoil cross section to impart aerodynamic lift to said craft when foilborne.

4. A hydrofoil structure for a water craft comprising, a hull,
- a hydrofoil strut attached to said hull by means of a support structure having a central point therein, said strut being capable of pivoting about said central point,
- a foil, fixedly attached to a revolving structure, said revolving structure being mounted on a first portion of said strut and capable of rotation about a second central point, said first portion being removed from said first central point, said support structure having a first connecting point thereon removed from said first central point and said revolving structure having a second connecting point thereon removed from said second central point, and the line intersecting said first central and connecting points being parallel to the line intersecting said second central and connecting points, and
- mechanical means connected between said first and second connecting points for controlling the angle of incidence relative to said hull to remain substantially constant in response to pivoting of said strut.

5. The hydrofoil structure in claim 4 wherein at least a portion of said mechanical means is substantially parallel to the line intersecting said first and second central points.

6. The hydrofoil structure in claim 5 wherein the distance between said first and second connecting points is equal to the distance between said first and second central points, and wherein the distance between said first central point and said first connecting point is equal to the distance between said second central point and said second connecting point.

7. The hydrofoil structure in claim 5 wherein said mechanical means has a third, fourth, and fifth connecting points all lying on the same line, said third connecting point being fixedly attached to said hydrofoil strut and lying on the line intersecting said first and second central points, said first central and said second, third and fifth connecting points lying on the four vertices of a first parallelogram and said second central and said second, third and fourth connecting points lying on the four vertices of a second parallelogram.

8. The hydrofoil structure in claim 7 wherein the distance between said first central and first connecting points equals the distance between said second central and second connecting points.

9. The hydrofoil structure in claim 6 wherein said mechanical means comprises a rack and pinion arrangement.

10. The hydrofoil structure in claim 7 wherein said mechanical means comprises a rod-like element connected between said first and second connecting points.

11. The hydrofoil structure in claim 4 wherein said support structure and said revolving structure form pulley wheels, and wherein said mechanical means is a pulley belt connected between and along the portion of the peripheries of said pulley wheels.

12. The hydrofoil structure in claim 7 wherein said support structure and said revolving structure are circular structures and said first connecting point is on the peripheral portion of said circular support structure.

13. The hydrofoil structure in claim 4 wherein said foil wing includes a fluid driven propulsion unit, and wherein said support structure has a third connecting point thereon and said revolving structure has a fourth connecting point thereon, said first and second central and first and second connecting points lying on the four vertices of a first parallelogram and said first and second central and third and fourth connecting points lying on the four vertices of a second parallelogram, and wherein said mechanical linkage means comprises two hollow rods, one of said rods being connected between said first connecting point and said second connecting point and the other of said rods being connected between said third and fourth connecting points, both of said rods being connected to a fluid pressure source and to said propulsion unit, whereby fluid from said pressure source is fed through one rod to said propulsion unit and exhausted from said propulsion unit through the other rod back to said fluid pressure source.

14. The hydrofoil structure in claim 5 wherein the line intersecting said first central and first connecting points makes an angle of from 35° to 55° with the line intersecting said first and second central points.

15. In a hydrofoil boat, at least one hull number, means supporting a hydrofoil, means pivotally connecting said supporting means to said hull member, said pivotal connecting means permitting operation of said hydrofoil supporting means between a first downwardly extending position in which said hydrofoil is positioned below said hull member for foilborne operation and a second rearwardly retracted position in which said foil is above the water level for hull-borne operation, said pivotal connecting means further permitting rotation of said hydrofoil supporting means throughout the full range of its rotation from its first position toward its second position when said supporting means strikes an object during forward motion of said boat, and means responsive to the position of said hydrofoil supporting means for maintaining a positive angle of incidence of said hydrofoil relative to said hull member as said hydrofoil supporting means moves over at least part of its range of movement.

16. The hydrofoil boat of claim 15 which further includes means responsive to a control signal for varying the angle of incidence of said hydrofoil independently of the position of said hydrofoil supporting means to thereby permit varying the trim of said boat in pitch.

17. The hydrofoil boat of claim 15 in which said responsive means maintains a substantially constant angle of incidence of said hydrofoil relative to said hull member as said hydrofoil supporting means moves over at least part of its range of movement.

18. The hydrofoil boat of claim 15 in which said hydrofoil supporting means comprises a strut which also supports a thrust means adjacent said hydrofoil, said connecting means including at least two conduit members extending longitudinally along said strut for varying the angle of incidence of said hydrofoil relative to said strut, and means for conducting fluid under pressure through said conduit members to said thrust means.

19. In a hydrofoil boat, a hull member, a strut, a hydrofoil supported by said strut, means pivotally connecting said strut to said hull, said connecting means permitting operation of said strut from a downwardly extended position to a rearward position in which said foil is above the water level when said strut or said foil strikes an object during forward motion of said boat, control means responsive to a control signal for varying the angle of incidence of said hydrofoil relative to said strut to control the lift of said hydrofoil, and means responsive to rotation of said strut for varying the angle of incidence of said hydrofoil relative to said strut to maintain a positive lift angle for said hydrofoil as said strut is rotated rearwardly from its downwardly extended position.

References Cited

UNITED STATES PATENTS

| | | | |
|---|---|---|---|
| 2,214,945 | 9/1940 | Weihmiller | 114—66.5 |
| 2,980,047 | 4/1961 | Korganoff et al. | 114—66.5 |
| 3,016,864 | 1/1962 | Woodfield | 114—61 |
| 3,236,202 | 2/1966 | Quady et al. | 114—66.5 |

FOREIGN PATENTS

| | | |
|---|---|---|
| 1,169,344 | 9/1958 | France. |

MILTON BUCHLER, *Primary Examiner.*

ANDREW H. FARRELL, *Examiner.*